G. B. GROVER.
CUTTING AND DIEING MACHINE.
APPLICATION FILED AUG. 21, 1912.

1,066,727.

Patented July 8, 1913.
7 SHEETS—SHEET 2.

Fig. 1ª.

Witnesses:
H. A. Rahn
D. L. Clark

Inventor:
G. B. Grover
by Wright, Brown, Quinby & May
Attys.

G. B. GROVER.
CUTTING AND DIEING MACHINE.
APPLICATION FILED AUG. 21, 1912.

1,066,727.

Patented July 8, 1913.
7 SHEETS—SHEET 6.

Witnesses:
H. A. Kuhn
D. F. Clark

Inventor:
G. B. Grover
by Hughes Brown Lunby May
Attys.

G. B. GROVER.
CUTTING AND DIEING MACHINE.
APPLICATION FILED AUG. 21, 1912.

1,066,727.

Patented July 8, 1913
7 SHEETS—SHEET 7.

Witnesses
H. A. Rahn
D. L. Clark

Inventor:
G. B. Grover

UNITED STATES PATENT OFFICE.

GEORGE B. GROVER, OF LYNN, MASSACHUSETTS, ASSIGNOR TO W. J. YOUNG MACHINERY COMPANY, OF LYNN, MASSACHUSETTS, A CORPORATION OF MASSACHUSETTS.

CUTTING AND DIEING MACHINE.

1,066,727.     Specification of Letters Patent.     Patented July 8, 1913.

Application filed August 21, 1912. Serial No. 716,215.

*To all whom it may concern:*

Be it known that I, GEORGE B. GROVER, a citizen of the United States, and resident of Lynn, in the county of Essex and State of Massachusetts, have invented certain new and useful Improvements in Cutting and Dieing Machines, of which the following is a specification.

The object of the invention hereinafter described and claimed is to produce a machine by means of which heel lifts and analogous articles may be rapidly and economically cut from sheet material, with a minimum waste of the material, and with a minimum of attention.

To this end the invention, broadly and briefly stated, comprises means for cutting strips from the material and means for receiving the strips as soon as they are separated from the sheets, and cutting from such strips the heel lifts or other articles, the machine being entirely automatic and requiring no personal attention except that of presenting the sheets to it in the first instance prior to the severance of the strips.

In the accompanying drawings wherein I have shown what I consider at the present time to be the preferred embodiment of the machine, Figures 1 and 1ª together represent the machine in front elevation. Fig. 3 is a cross section on line 3—3 of Fig. 1, showing the dieing out mechanism in side elevation. Fig. 8 is a cross section of the die carrier and the lift separator.

The same reference characters indicate the same parts in all the figures.

In the drawings, 1 represents a table on which the sheets to be cut into lifts are first laid, and 2 is a gage by which the width of the strip cut from the sheet is determined.

3 and 4 represent a pair of coöperating feed rolls, by which the sheet is gripped and fed to the cutters. These rolls are mounted respectively above and below the plane of the table or substantially parallel shafts 5 and 6, of which the former is contained in bearings in a fixed bracket 7 rising at one side of the table, and the latter is held in a swinging bracket 8 pivoted on a shaft 9 and pressed toward the bracket 7 by springs 10 of which the tension is regulated by screw abutments 11. Just beyond the shafts 5 and 6 in the direction of feeding, is a second pair of shafts 12 and 13 of which the former is held in a part of the fixed bracket 7 and the latter is mounted in a second swinging bracket 14, also pivoted on the shaft 9 and pressed toward the bracket 7 by springs 15 having adjustable abutments 16. The shaft 12 carries a feed roll 17 and a disk cutter 18, while the shaft 13 carries a complemental feed roll 19 and a complemental disk cutter 20. The periphery of the cutter 18 overlaps that of the cutter 20 and is in substantial contact with the latter, so that the two cutters act in effect as an endless shear. The rolls 3 and 4 first grip the material and feed it positively and in a definite path to the cutters, and then the rolls 17 and 19 also grip and feed the material until a strip has been cut from the entire length thereof. The strip thus cut from the sheet of stock, the width of which is governed by the distance of the gage 2 from the plane in which the cutting edges of the cutters lie, passes to a pair of feed rolls 21 and 22, having comparatively short faces, and one or both of which may even be spherically formed in order to limit the extent of contact with the strip and allow the latter to shift its direction of movement if desired. The first two pairs of feed rolls, however, have wide faces to make contact over a considerable width of the strip in order to insure that it will be fed in a straight line and that the strip cut will have uniform width.

After passing the rolls 21, 22 the strip traverses a bridge table or chute 23, having a hinge 24 at one end connecting it to an upright 25, and having a hinge 26 at the other end connecting it to a table 27. The latter table is supported in a manner presently to be described and projects under, and close to the under surface of a cutting block or abutment 28, terminating near a cutting die 29. The bridge table or chute is variable in length for a purpose to be described and is preferably constructed as follows. The end next to the hinge 26 is a solid plate 30 having ears 31 contained between ears 32 of the fixed table 27, through which passes the hinge pintle 26. Bars 33, 34 are secured to the plate 30 and form the sides of the chute, the bottom being formed by a comparatively thin plate 35 underlying the side bars 33, 34 and gripped between the ends of the latter and the plate 30. The opposite end of the bridge table is formed by a plate or member 36 having ears 37 through which passes the hinge pintle 24, and to which there is connected a thin plate 38 overlying and sliding telescopically on the bottom plate 35. The edges of this sliding plate 38 are contained in grooves in the side bars 33, 34. Owing to this construction the bridge table can be lengthened without interrupting the continuity of its bottom. Overlying and connected to the side bars are transverse plates 39 and 40 of which the edges extending toward the advancing strip are bent upward for the purpose of allowing the strip to pass under them and of holding down the strip and preventing it from rising above the bottom of the table. Connected to the side bar 34 there is a lateral guide 41 in the form of a long and flexible spring strip, the purpose of which is to engage one end of the work strip and offset it toward a guide 41$^a$ on the fixed table 27.

Figures 1, 8:
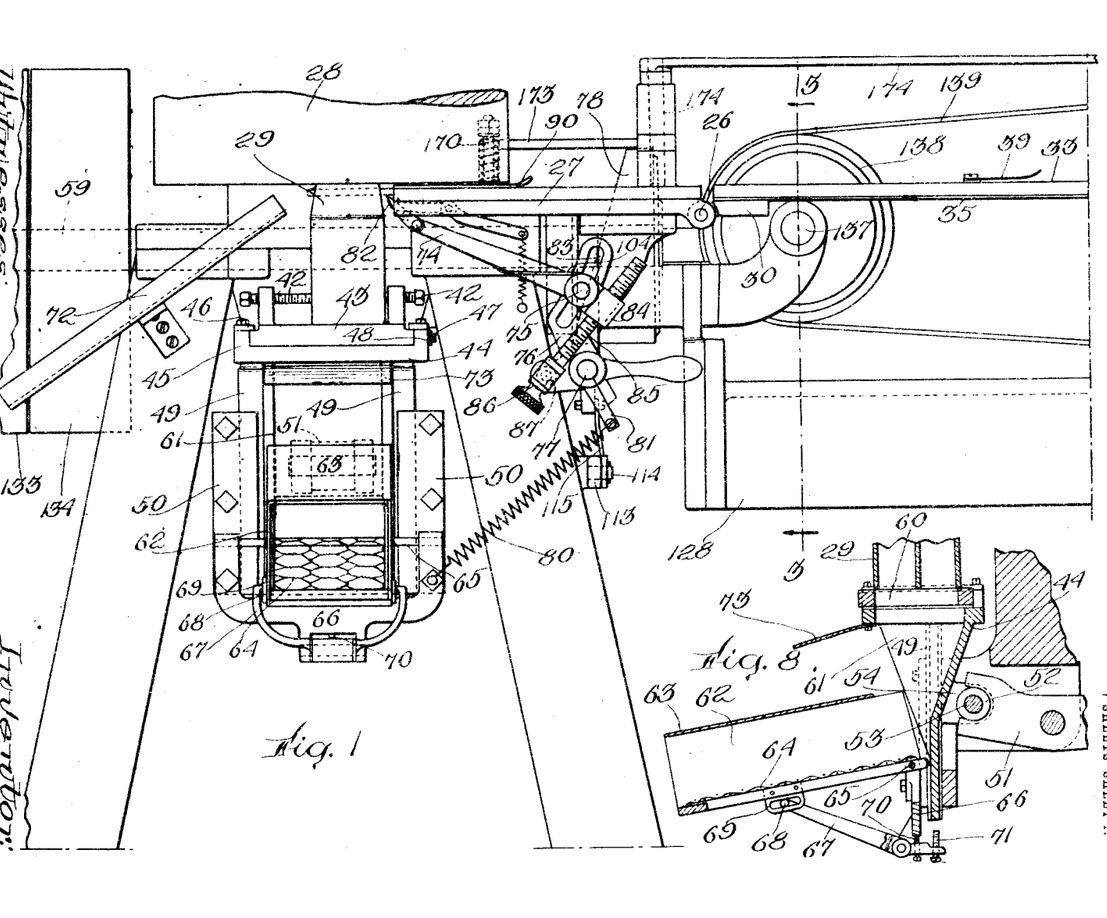
Figure 1A:
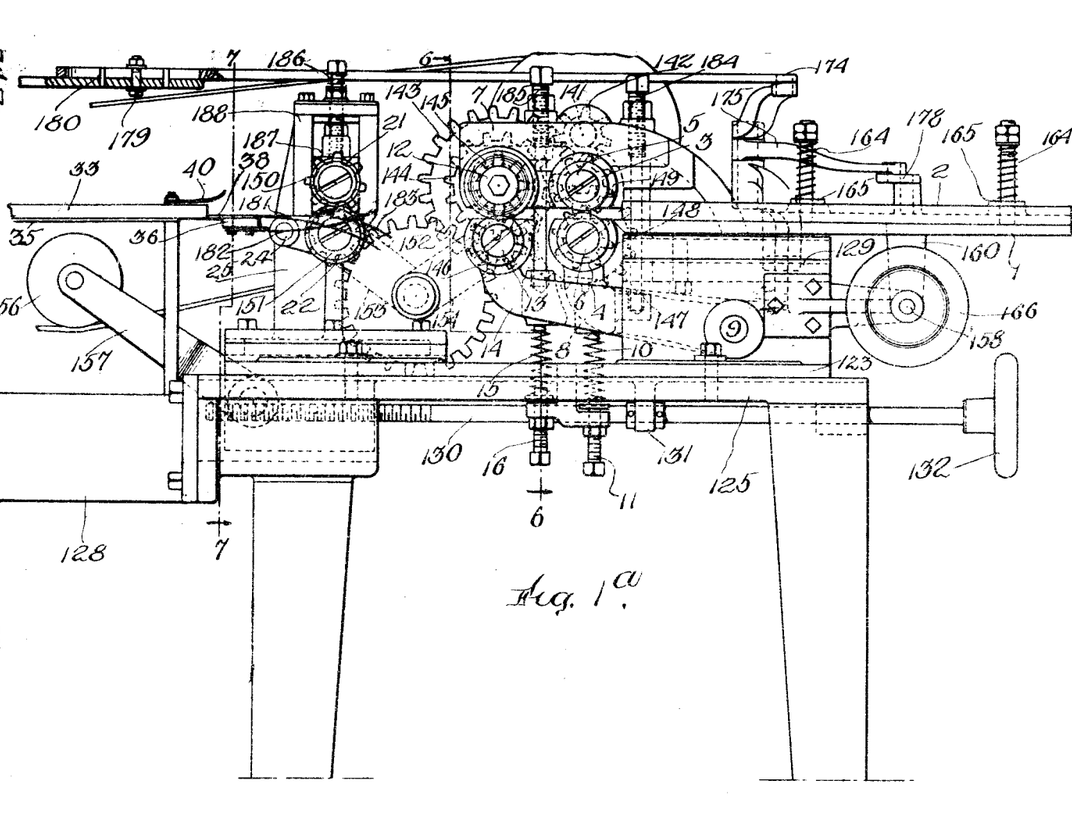
Figure 5:
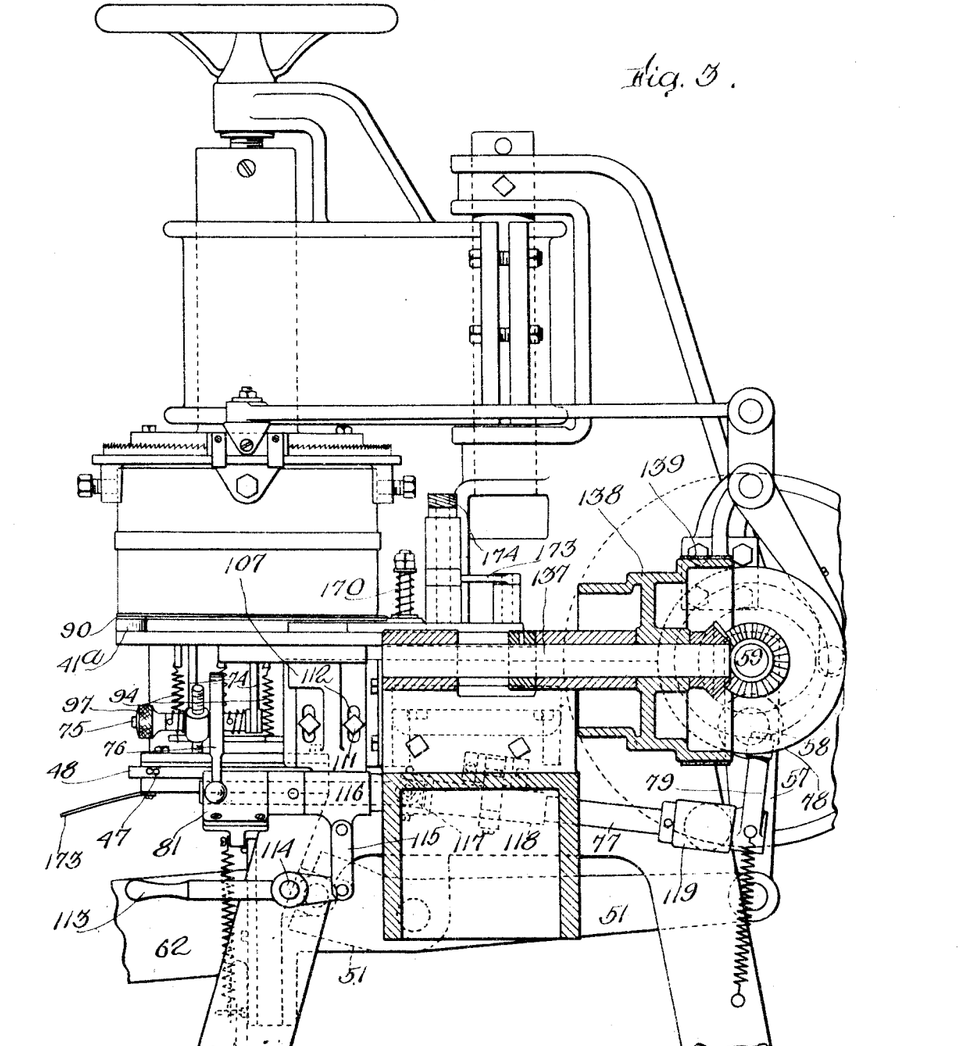
Fig. 5 is a front elevation of a part of the strip feeding mechanism.

The die 29 shown in Figs. 1, 5, and 8 of these drawings is designed to cut two heel lifts simultaneously from a strip of stock, and to that end has the outline of two heel lifts placed breast to breast, and has a central transverse partition. It is tubular and its walls and the transverse partition are sharpened on the end next to the cutting block. This tubular die is detachably held by clamp screws 42 upon a plate 43 which is secured in a holder 44, the latter having ribs 45 embracing the sides of the plate 43 and gibs 46 overlying the edges of the plate. This construction of the holder enables the plate to be slipped into and out of the holder, and to be secured in the holder by a pin 47 carried by a spring 48 secured to the outer side of the holder and projecting through one of the ribs 45 into a socket in the edge of the plate 43. The holder 44 has also upright ribs 49 extending in approximately the direction of the length of the die 49, which ribs are contained in guideways 50. The holder is reciprocated to move the die toward and from the cutting block 28 by means of a lever 51 having a forked end which embraces a sleeve or roll 52 on a pin 53 carried by lugs 54 on the back of the holder, the lever being oscillated by a connecting rod 57 engaged with a crank pin 58 carried by a driving shaft 59, as shown in Fig. 3. It will be seen that the die is thus alternately forced against and withdrawn from the cutting block 28, and that when any sheet material is between the die and the block, a piece having the outline of the die is cut from the material and forced into the die. The addition of successive pieces and the vibration of the die cause the pieces to travel downward through the die and through an opening 60 in the plate 43 and a passage 61 in the holder 44, into a chute 62 which is also a separator adapted to separate scraps from the perfect lifts. Said chute and separator is a box open at both ends, having a closed top 63 and a bottom 64 of coarse meshed wire fabric. It is pivoted at 65 to a fixed part 66 of the machine frame and is engaged with a lever 67, by means of a pin 68 on said lever contained in a slotted bracket 69 on the separator, which lever is pivoted to a bracket on the fixed part 66 and has a stop 70 adapted to engage the part 66 and an abutment 71 adapted to be engaged by the die holder 44. At every descent of the latter the abutment 71 is struck and the separator given an abrupt movement. The motion of the die holder is so rapid that the separator is kept in rapid and violent agitation, whereby the pieces passing through it are tossed about and all the pieces sooner or later brought into contact with the meshed bottom 64. Those pieces small enough to pass through the mesh do so. The latter pass from the lower end of the separator into a receptacle placed to receive them.

The stop 70 and abutment 71 are adjustable so as to vary the amount of agitating movement given to the separator. The perforated bottom of the latter is removable and replaceable by bottoms of different sized mesh, in accordance with the sizes of lifts which the machine is set to produce. As the die is readily removable from the holder, various dies of different sizes may be mounted thereon, and the mesh bottom is varied accordingly. The scraps of material which fall beyond the die are caught and conducted away by a deflector 72, while those falling in front of the die are prevented from entering the separator by means of a guard plate 73 secured to the front side of the die holder above the separator.

Figures 2, 9:
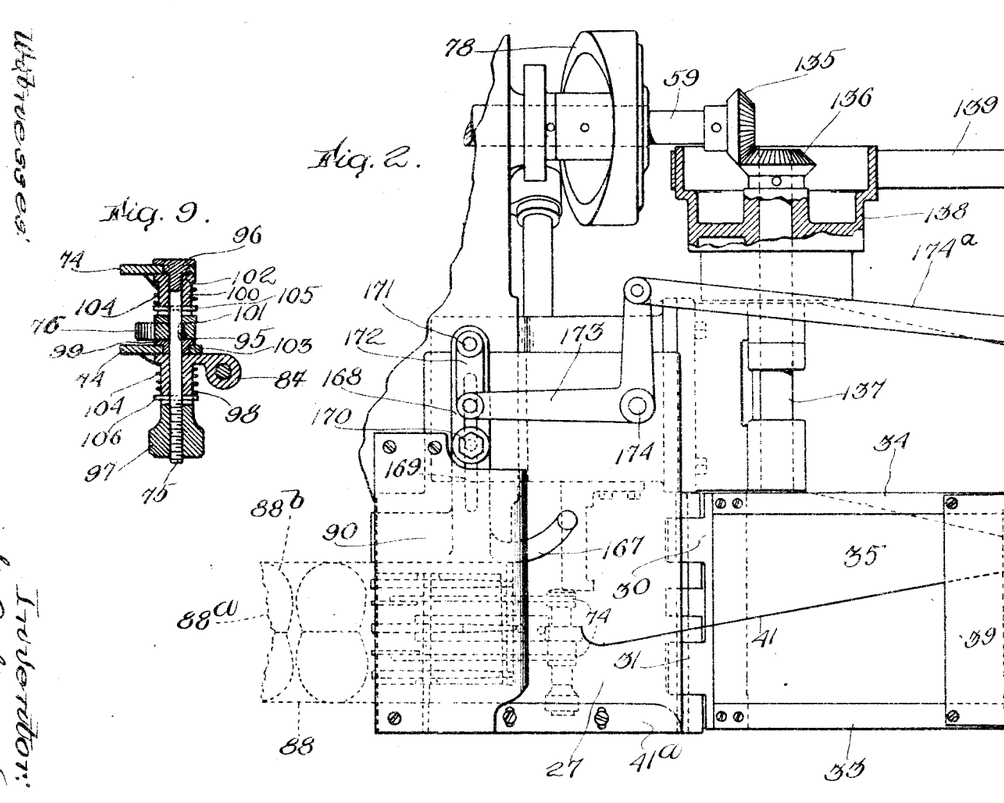
Figs. 2 and 2ª represent all of the machine, except the dieing out mechanism, in plan.
Fig. 9 is a detailed section on line 9—9 of Fig. 5.
Figure 4:
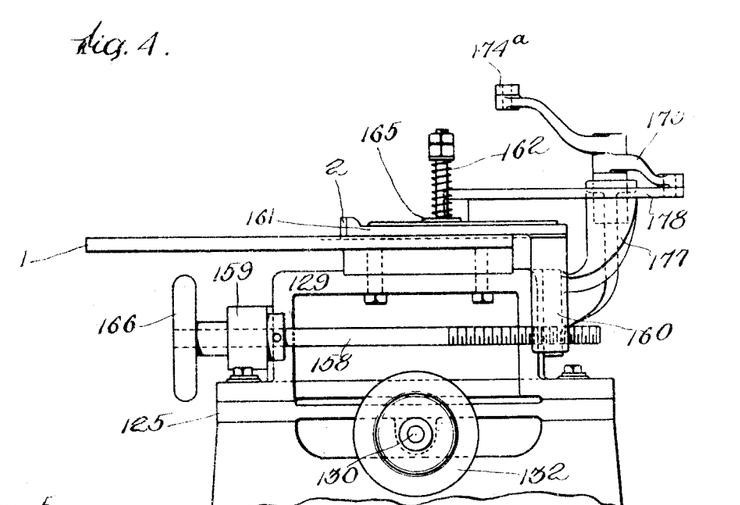
Fig. 4 is an elevation of the right hand end of the machine.

An intermittent feed for advancing the strip between cutting strokes of the die is given by a plurality of feed fingers 74, here shown in Fig. 2, as being two in number, pivoted upon a pin 75 carried by an arm 76 on an oscillating shaft 77. The latter is moved in one direction by a cam 78 of which the active face is offset axially, on the shaft 59 engaging an arm 79 on the shaft 77, and in the other direction by a spring 80 which holds the arm 79 against the face of cam 78 and is connected to an arm 81. Thereby the feed fingers are moved back and forth, having their forward or feeding movement while the die is separated from the block.

They are provided with sharpened points 82 detachably connected to permit renewal. The extent of feed is varied by adjusting the pin 75 on arm 76, the pin passing through a slot 83 in such arm and being carried by a nut 84 meshing with the threads of a screw 85, having a bearing in a block 86 which is swiveled at 87 to the arm. The slot 83 is eccentric to the rock shaft 77 so that when the pivot pin 75 is adjusted therein by the screw 85 its distance from the shaft, and thereby the extent of movement imparted to it, is altered. At the same time the slot is approximately concentric, when the arm is at the end of feeding movement, to the location occupied by the pointed end of the feed finger at the conclusion of the feeding stroke. Thus the adjustments, although they change the total length of the feed stroke, do not alter the point at which the finger ends its feeding travel, but the variations for long or short feed occur entirely at the beginning of the stroke.

The table 27 is cut away at the side next to the die over the feed fingers sufficiently far to admit the finger points throughout the travel of the latter, as shown in Fig. 5, and the stock or strip 88 when in engagement with the fingers, is pressed by the fingers against a plate 89, supported by the table and overlying the same at such a height as to permit the stock to pass beneath it. This plate terminates short of the die. Its forward end is bent up at 90, to allow the advancing end of the stock to pass easily under it, even though such advancing end should be slightly raised. Between and flanking the feed fingers are holding fingers 91 pivoted on a rod 92 passing across the recess in the rear part of the table which contains the fingers, and supported by brackets 93 secured to the under side of the table. These fingers are actuated by springs 94 so that their active ends are pressed toward the cutting block. Such active ends extend beyond the plate 89 to a point where they just clear the die. They not only hold the stock against withdrawal but also press the end of the stock from which the last cut is taken against the cutting block and prevent it from getting out of place after the feed fingers have left it.

Attention is called to Fig. 9 for a showing in detail of the manner by which the feed fingers are mounted on the pivot 75 so that they may swing freely on said pivot even when clamped to the arm 76. The pivot 75 is a rod or pin passing through the slot 83 and having a non-circular key portion 95 lying in said slot to prevent its rotation. On one end of the pin is a head 96 and on the other there is threaded a nut 97, which, when screwed home bears against a sleeve portion 98 on the nut 84 and presses the latter against a collar 99 and the collar against one side of the arm 76. The head 96 bears against a sleeve 100 which bears on a washer 101 and presses the latter against the opposite side of the arm 76 from the collar 99. Thus the pivot pin can be rigidly clamped to the arm. The head 96 has a shoulder bearing 102 on which one of the feed fingers 74 is hung and the collar 99 has a similar shoulder bearing 103 on which the other feed finger is hung. These shoulders are wider than the thickness of the fingers, so the fingers cannot be gripped but are always free to swing pivotally. The fingers are upheld by springs 104 surrounding the sleeves 98 and 100, each having an end underlying and pressing up against its respective finger. One of these springs is secured at its other end to a pin 105 passing through the rod 75 and through slots in sleeve 100 and the other spring is connected to a pin 106 passing through the rod and through slots in the sleeve 98. From the foregoing it will be seen that the strips of stock are fed step by step between the die and the cutting block, the feeding movement being timed to occur between operations of the die, and that the extent of feed may be made to correspond with the size of the die so that the feed may be great enough at each step to make a perfect lift, but not great enough to cause an excessive amount of waste.

Provision is made for adjusting the table 27 toward and from the cutting block. It is supported on a bracket 107 which has an upright web 108 lying against a guide plate 110 connected to the framing of the machine. Fastening bolts 111 pass through slots 112 in the web 108 and secure the bracket. A handle 113 is pivoted to a stud 114 on the machine frame and is connected by a link 115 with the bracket, whereby to raise or lower said bracket when the bolts 111 are released. The feed fingers are not disarranged when the table is thus moved because the rock shaft 77 operating such fingers is supported in a bearing 116 which is connected to the bracket and is moved simultaneously with the bracket and table. Between the ends of this shaft there is a universal joint 117 and a telescopic portion 118, and the end to which arm 79 is connected is held in a swiveled bearing 119, so that the shaft may yield and elongate to allow free movement of the feeding fingers with the table.

From the foregoing description it will be understood that the strip after being cut from the sheet by the cutters 18 and 20 and fed at a uniform rate of speed by the feed rolls, previously described, is engaged by the feeding fingers and advanced intermittently to the cutting die. It is essential that the strip should be advanced by the feed rolls far enough for its advancing end to be engaged by the feed fingers, and it is equally essential that the strip should be released by the feed rolls before the feeding fingers engage it.

Figure 7:
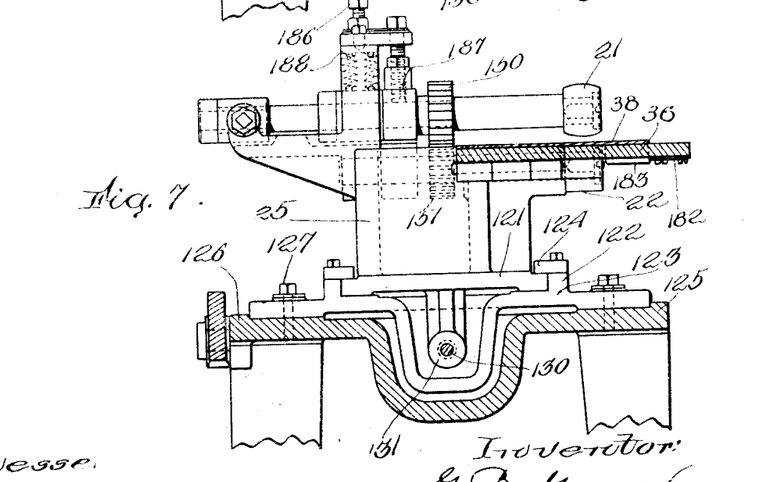
Fig. 7 is a cross section on line 7—7 of Fig. 1ª looking in the direction of the arrow.

As the sheets of commerce from which the strips are cut vary in length, and as the movement of the feed fingers is varied according to the size of the cutting die, a highly important feature of the machine is the provision of adjustable means by which the proper extent of feeding by the rolls and the release of the strip from the rolls at the proper time may be accomplished, in accordance with the lengths of stock and the size of the lifts. To permit such adjustments, the upright 25 which supports the feed rolls 21 and 22 is mounted on a base or plate 121, best shown in Fig. 7, which is mounted slidingly upon guiding ribs 122 on a bed 123 and is retained by holding strips 124. The bed 123 is supported on a base 125 being placed between guides 126 thereof and held by bolts 127. The base 125 is a part of the framing of the machine, being rigidly connected with the part which carries the cutting mechanism and intermittent feed by a beam 128. The details of the framing construction are not important and may vary widely in form from those here shown, provided the base which supports the feed rolls is rigidly connected with the base which supports the cutting mechanism. Rising from the bed 123 is a head 129, on which the work table 1 is mounted, the bracket 7 is secured and the brackets 8 and 14 are pivoted. The entire bed 123 carrying the head 129 and the post 25, with all the feed rolls may be moved toward and from the cutting mechanism after loosening the clamping bolts 127. The purpose of this adjustment is to accommodate sheets of various lengths, allowing sufficient room between the lift cutting mechanism and the strip cutting and feeding mechanisms for the strip to be entirely cut from the sheet, and, on the other hand, not providing an unnecessarily great space between these mechanisms.

The upright 25 is independently adjustable on the bed 123 and is adjusted by a screw 130 threaded through a lug 131 projecting below the base of the upright 25 and passing through the bracket 131 on the under side of the bed 123. The screw shaft is not threaded where it passes through the bracket 131 and it has secured upon it collars on both sides of said bracket, whereby it can turn but cannot move endwise in the bracket, and when turned, it will move the sliding post back and forth. A hand wheel 132 is on the screw shaft to turn the latter. This last adjustment is a fine and accurate one, provided to accommodate the feed rolls 21 and 22 to the feeding travel of the intermittent fingers 74. Said feed rolls are so placed by means of the screw that they will release the rear end of the strip when its advancing end has passed just beyond the limit of back travel of the feed fingers, far enough to enable these fingers to catch it. In practice it is usually necessary, however, to cause the strip to be advanced a little beyond the limit of return travel of the feed fingers, because the sheets of leather board are generally rough and uneven on their edges, both as to thickness and length. So the feed rolls are set to advance the strip so far that the fingers will feed the end of the strip a short way over the die on the first movement, far enough for the first cut of the die to take off the rough edge. This is represented in Fig. 2 where the rough front edge of the stock is shown in dotted lines at 88$^a$, the curved lines 88$^b$ represent the first cut of the die which removes the uneven edge, leaving the strip in such condition that the second and succeeding cuts up to the last will die out perfect lifts. The scrap removed on the first cut of course falls through the die with the cut lifts, but it is separated therefrom by the separator 62. This adjustment is an important thing particularly because it effects a considerable saving in stock, causing the waste unavoidably due to the rough edge of the sheet to be the least possible amount. In these adjustments of the upright 25, due either to the movement of the bed 123 or produced by the screw, the bridge table is lengthened or shortened correspondingly, owing to its construction as described and remains always connected with the upright 25 and the table 27.

While the rolls 21 and 22 are useful for the purposes and reasons heretofore set forth, yet they are not absolutely essential and may be omitted without impairment of the utility of the machine and without departing from the spirit of the invention. Even if these rolls should be omitted, the feed rolls 17 and 19 could still serve to advance the cut strip far enough to enable the forward end of the latter to be engaged by the intermittent feeder, because of the fact that the bed 123 on which all of the rolls are mounted is adjustable toward and from the location of the die. In other words I consider that a machine which lacks the rolls 21 or 22 or their equivalent, but which has the other main features of my combined machine, that is, the continuous feed in connection with the strip cutter, and the intermittent feed in connection with the cutting die, and the provision by which the intermittent feeder automatically delivers the strip to a position to be taken by the intermittent feed is within the scope of my invention and it is covered by any of the appended claims which do not specifically include the rolls 21 or 22 or their equivalent.

I will now describe the driving mechanism by which all the parts are moved properly in unison.

Figure 6:
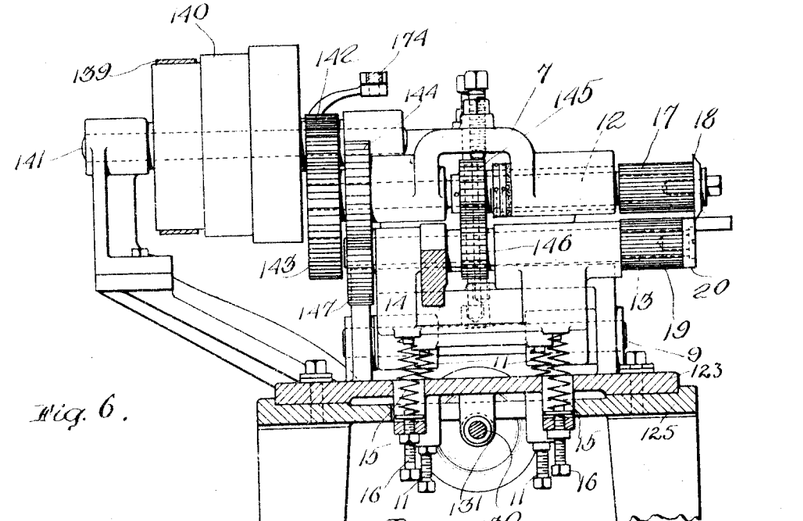
Fig. 6 is a cross section and elevation on line 6—6 of Fig. 1ª looking in the direction of the arrow.

Power is given to the machine by a belt passing over one of the fast and loose pulleys 133 and 134 on the shaft 59, already mentioned. This shaft carries the crank pin 58 and cam 78, and it also carries a beveled gear 135 which meshes with a beveled gear 136 on a transverse shaft 137. The latter shaft also carries a step pulley 138 over which passes a belt 139, said belt being carried around a complemental stepped pulley 140 on a shaft 141 which is arranged above the shaft 5 of the feed roll 3. On the shaft 141 is a gear wheel 142 which meshes with a gear wheel 143 on the shaft 12. Gears 144 and 145 are also secured on this same shaft, and the last named gear, that is, 145, meshes with the complemental gear or pinion 146 on shaft 13, shown clearly in Fig. 6. Gear 144, before mentioned, meshes with a pinion 147 on the shaft 6 of feed roll 14, the latter shaft carrying also a pinion 148 meshing with a complemental pinion 149 on shaft 5 of feed roll 3. Thus it will be seen that the feed rolls 3, 4, 17 and 19 are all driven positively and at the same speed, this being due to the fact that the intermeshing gears 144 and 147 have the same number of teeth and that pinions 145, 146, 148 and 149 are all of the same size and pitch. The feed rolls 21 and 22 are driven in unison with the other rolls, being positively geared together by pinions 150 and 151 on their shafts, and the latter pinion being meshed with an idle gear 152 which also meshes with pinion 146. Pinions 150 and 151 are of the same size as 146, hence rolls 21 and 22 turn at the same rate as the other feed rolls. The rolls are all of the same diameter and hence have the same peripheral speed. The idler 152 is carried by toggle links 153 and 154 hung upon the shafts of the feed rolls 22 and 19, respectively, the pivot stud 155 of such idler being held in the overlapping ends of these links. Thus driving connection is maintained between the feed roll shafts in all positions of the upright 25. The driving belt 139 is kept under tension in all adjustments of the bed 123, by a tension roll 156 carried by a pivoted arm 157 and pressed by gravity against one stretch of the belt.

The gage 2 which governs the width of the strips cut is adjusted transversely of the table 1 by a screw 158 having a bearing in a bracket 159 secured to the head 129, and in threaded engagement with a post 160 hanging down from the gage. This gage comprises in part the ledge to which the character 2 is applied and in part a rearwardly extending plate 161 resting on the rear part of the table 1 and carrying the threaded post 160. Bolts 162 rise from the rear part of table 1 through slots 163 in the gage plate and carry nuts on their upper ends confining springs 164 which react against the nuts and bear on friction washers 165. Said washers bear against the gage plate and frictionally hold the same in all positions of adjustment. The screw 158 has a hand wheel 166 whereby it may be turned.

Coöperating with the edge guide 41ª of the table 27 is an opposed guide 167 to compel proper alinement of the strip with the dies. This guide must be adjustable to accommodate strips of different widths and the automatic means whereby it is adjusted in connection with the adjustable gage 2 is a feature of the invention. Guide 167 is slidingly supported on the plate 27 and has an extension 168 provided with a slot 169 through which extends a bolt 170 having a friction device similar to those already described in connection with the gage. A post 171 on the extension is connected by a link 172 with a bell crank lever 173 pivoted to a stud 174 on the table 27. This lever 173 is also connected by a connecting rod 174ª with one arm of a second bell crank lever 175 having a bearing at 176 on a bracket 177 rising from the head 129. The other arm of this bell crank is connected by a link 178 with the gage plate 161. Thus transverse movement of the gage correspondingly moves the guide 167. The connecting rod 174 is made in two parts, as shown in Fig. 2ª, which overlap and are connected by a clamp 179 passing through the parts, one of such parts being slotted. Guide pins 180 coöperate with the clamp in keeping the two parts of the connecting rod in alinement. Thereby the connecting rod may be lengthened or shortened according to the position of the bed 123 without destroying the proper relation between the gage 2 and the guide 167.

Provision is made for separating the sheet of stock from the strip after the longitudinal cutting thereof. Such provision comprises a guide 181 secured to the end 36 of the bridge table and projecting oppositely to the feed of the stock beyond the feed rolls 21 and 22 and downwardly, and another guide 182 fastened to the bridge table and extending in the same general direction as the guide 181, but on an upward slant, being in front of the guide 181. There is also a rearwardly and downwardly extending guide 183 fastened to the bearing for the shaft of roll 22. Guide 183 supports the advancing end of the strip and conducts it properly to the rolls 21 and 22, while guide 182 bends down the body of the sheet out of the way and guide 181 supports that edge of the strip next to the sheet which is being bent down, and insures that it will pass properly onto the bridge table.

Suitable provision is made for the yielding of one of each pair of feed rolls to accommodate the differences in the thicknesses of stock. The rolls 4 and 19 are adapted to yield by the spring-supported brackets 8 and 14, the movement of which brackets toward the unyielding rolls is limited by screw pins 184 and 185, respectively, adjustably supported by the bracket 7 and engaging the brackets 8 and 14. Adjustment of the roll 21 is made by a screw 186 engaged with the bearing box 187 of the roll shaft, which box slides in a guide 188 on the top of the upright 25.

I claim:

1. An organized machine comprising in combination a support for a sheet of stock, means for cutting a strip of predetermined width from said sheet, an intermittently acting cutting die and means for intermittently advancing the strip so cut to said die between operations of the latter.

2. An organized machine comprising in combination means for feeding a sheet of stock, continuously acting means for cutting a strip of predetermined width from said sheet, an intermittently acting cutting die, intermittently acting feed means for said strip, and guiding means for conducting the strip from the first named feeding means to the second feeding means.

3. A dieing out machine comprising a cutting die, a cutting block, means for producing relative movements of approach and recession between said die and said block, an intermittent feed arranged and operated to feed a strip of stock between the die and block between cutting strokes of the die, a cutter operable to sever strips from a sheet of stock, and continuously acting feed means arranged to deliver a strip so cut to the intermittent feeding means.

4. A machine for the purpose described comprising a frame having parts rigidly connected together, a work feeding and cutting means mounted on a part of said frame, said feeding and cutting means being constructed and arranged to sever a strip from a sheet of stock, and to advance such strip, a back and forth moving feeder mounted on another part of the machine, a reciprocating cutting die movable transversely to the movement of said feeder adjacent thereto, and an adjusting means for so placing the first named feeding means that the latter releases the strip when the advancing end of the strip overlaps the path of travel of the back and forth moving feeder.

5. A machine of the character described comprising a rotary slitter adapted to cut a strip from a sheet of material, uniformly rotating feed rolls arranged to advance a strip so cut beyond the cutting means, an intermittent feeder located at a distance from said feed rolls and arranged to move back and forth in the direction of feed of the strip, and a cutting die reciprocated across the line of feed of the strip, said feed rolls being arranged to release the strip when the advancing end thereto overlaps the rear limit of travel of said intermittent feeder, and before said feeder engages the strip.

6. An automatic machine for cutting heel lifts from sheet material, comprising in combination a cutter adapted to cut a strip from a sheet of stock, automatic mechanism for operating said cutter and for feeding the stock thereto, a back and forth moving cutting die, an intermittent vibrating feeder for advancing the sheet to the die between strokes of the latter and continuously acting means for conducting a strip severed by said cutter into position for engagement by said intermittent feeder.

7. A lift cutting machine comprising in combination means for severing strips from sheet material, a periodically operating cutting die, an intermittently acting feeding means arranged and operated to take a strip after severance thereof from the sheet and feed the strip step by step to the die between operations of the die.

8. A lift cutting machine comprising a table adapted to support a sheet of stock, rotary shearing cutters, feed rolls for conveying the sheet material past the cutters whereby a strip is cut therefrom, a bridge table connected at one end with a set of such feed rolls, a table relatively remote from said feed rolls from which the other end of such bridge table is connected, a cutting die located adjacent to the last named table and reciprocating transversely to the plane thereof, intermittently acting feeding means for advancing the strip across said die between actuation of the latter, and means for adjusting said set of feed rolls toward and from said die, the bridge table being extendible and contractible in length to permit such adjustment.

9. A machine of the character described comprising a rigid frame or base, coöperating cutting members, one of which is a die, on one part of said frame, a work supporting table adjacent to said members, an intermittent feeder arranged and operated to vibrate longitudinally of said table toward and from the die, a support mounted on a relatively distant part of said frame, a pair of feed rolls carried by said support, the support being adjustable toward and from the die, and a bridge table connected to said first table and to said support, being operable as to length.

10. A dieing out machine comprising a base frame, a cutting die mounted upon one part of said frame, a strip cutter mounted upon another part of said frame, a slide carrying said strip cutter adjustably mounted on the frame with provision for movement toward and from the die, a pair of feed rolls between said strip cutter and said die, a holder for said feed rolls adjustably mounted on said bed and movable independently of the latter toward and from the die, a strip support extending from said feed rolls into proximity with the cutting die and being operable in length and an intermittent feeder located near the die and adapted to move in a line between the die and the feed rolls.

11. A dieing out machine comprising means for cutting a strip from sheet material, means for feeding a strip so cut, and a cutting die arranged to reciprocate across the line of feed of the strip.

12. A dieing out machine comprising in combination a rigid frame, a bed supported upon said frame, a head secured on said bed, a table on said head, a pair of feed rolls located, respectively, above and below the plane of said table, a second pair of feed rolls similarly located beyond the first pair of feed rolls, a set of complemental rotary shearing cutters mounted with the feed rolls of the second set, an upright adjustably mounted on said bed, a pair of coöperating feed rolls mounted on said upright, gearing connected with all of said feed rolls and proportioned to cause them all to rotate at the same rate, said gearing including a floating idle gear between the second and third sets of feed rolls, a telescopic table connected to the upright and extending therefrom in the direction of feeding, a cutting die located beyond the opposite end of said telescopic table, a cutting block, and means for reciprocating said die across the plane of the table toward and from the cutting block.

13. In a machine of the character described in combination with a cutting die, a work supporting table adjacent thereto, a pair of feed rolls, and a support remote from said die carrying said feed rolls, a bridge table pivotally connected at one end to said support and at the other end to the first named table, the bridge table being discontinuous between its ends and having a bottom composed of overlapping plates, one of which is connected to the support and the other to the first named table.

14. In a machine of the character described an extendible table comprising a bottom plate and attaching means at one end thereof, side bars connected to said bottom plate and having grooves in their inner sides close to said bottom plate, and an extension bottom plate overlying the first bottom plate and having its edges contained in said grooves, being movable longitudinally thereof and having attaching means at its end opposite to the attaching means of the first named plate.

15. In a machine of the character described, a cutting table, shearing means for severing a strip of sheet material, a gage for determining the width of strip severed, said gage being adjustable toward and from the plane of the shearing means, a cutting die, a supporting table adjacent to said cutting die, an adjustable guide for the strip passing to said die, and connections between said guide and gage for shifting the former in accordance with adjustments of the latter.

16. In a machine for stripping, feeding, and dieing out sheet material, a strip cutting mechanism comprising a supporting table, feed rolls parallel to said table adapted to grasp material placed on the table, complemental rotary shearing cutters associated with said feed rolls, a support independent of the table, an additional pair of feed rolls mounted in said support, and adjustable with the latter toward and from the first-named feed rolls, an idle gear meshing with pinions on the shafts of the different feed rolls, and links hung from said shafts respectively, coöperating to hold the pivot of said idle gear.

17. A dieing out machine comprising in combination a tubular cutting die having cutting edges at one end, a block against which said cutting die presses the stock in cutting, a reciprocating die carrier having an opening at the butt end of the die registering with the passage through the latter, a separating chute having one end arranged to receive pieces discharged from the die, and having a perforated bottom, and means arranged for operation by said die carrier for putting said separator into rapid vibration, whereby to agitate the pieces therein and cause the smaller pieces to pass through the perforations in the bottom.

18. A dieing out machine comprising in combination with a cutting die and means for feeding the stock across said die intermittently between cutting strokes of the latter, continuously acting means for cutting a strip from a sheet of stock and for advancing such strip to said feeding means, said continuously acting means being adjustable toward and from the feeding means to accommodate variations in length of the material acted upon.

19. The combination in a machine of the character described of a strip cutter, a continuously acting means for feeding stock past said strip cutter, a reciprocating die and intermittent feeding means for presenting the stock to the die, said continuously acting feed means being arranged to release the stock when the advancing end thereof is in position for engagement by the intermittent feeding means and prior to disengagement thereby.

20. In a machine of the character described, the combination with a frame of a cutting die mounted upon said frame and movable reciprocatively, a bed mounted on another part of the machine with provision for adjustment toward and from said die, a cutting table and cutting means mounted upon a part of said bed, feed rolls between the cutting means and the die mounted upon said bed with provision for independent adjustment thereon, and an adjusting means for moving said feed rolls.

21. In a machine of the character described the combination with a stock table, of a plurality of sets of feed rolls adapted to grip the stock simultaneously, complemental rotary shearing cutters connected with the feed rolls of one set, said feed rolls having wide faces to prevent deflection of the stock from being fed in a straight line, a cutting die arranged to reciprocate substantially across the plane of the stock at a distance from said feed rolls, and an intermediate pair of feed rolls, one of which has a narrow bearing face to permit sufficient deflection of the advancing strip to allow for displacement of the die out of the normal line of feed.

22. An automatic machine for dieing out blanks from sheet material, comprising continuously acting feed means constantly operative to advance the material, a strip cutter arranged to sever a strip of predetermined width from the material during such advance thereof, an intermittently acting strip feed located to engage the strip, when the latter has passed from the action of said continuously acting feed means, and operated to advance the strip step by step, complemental block and die members, one of which is movable toward and from the other across the path of feed, and mechanism for so moving the movable member between steps of the intermittent strip feed.

23. A machine for cutting out blanks from sheet material comprising in combination a strip cutter, feeding means for propelling the sheet material past said strip cutter, an intermittently acting cutting die, and feeding means arranged to advance the strip produced by said strip cutter, and advance the strip step by step to the cutting dies between operations of the latter, said first named and last named feeding means being relatively adjustable, one toward and from the other in accordance with stock of various lengths, whereby to cause the last named feeding means to engage the strip when the latter is released by the first named feeding means.

24. A machine for cutting heel lifts from sheets, comprising a table adapted to support a sheet, a gage for locating an edge of the sheet, a strip cutter having its cutting edge in a plane parallel to said gage and which plane is at a distance from the gage equal to the width of the strip to be cut, a coöperating die and cutting block constituting complemental cutting members, one of which is movable toward and from the other, means for so moving said movable member, a strip feeder adjacent to said members, mechanism constructed and arranged to move said feeder intermittently toward the said members between cutting strokes of the moving member, and means for transferring a strip cut from the sheet to the range of action of said feeding means.

25. A dieing out machine comprising a support adapted to support a sheet of stock, gaging means for locating such sheet against which an edge of the sheet may be placed, a strip cutter arranged with its cutting edge in a plane parallel to the line of the gaging means and adapted to be operated to sever the portion of the sheet lying between such plane and the gaging means, means for engaging and feeding a strip cut thereby, coöperating cutting members arranged on opposite sides of the line of feed of the strip, and means for causing one of said members to move toward the other member across such line, whereby to cut the strip fed between the members.

26. A dieing out machine adapted to cut strips from a sheet of stock and to cut articles from such strips, comprising a support for the sheet, gaging means arranged to locate the edge of a sheet supported by said support, a strip cutter having its cutting edge occupying a plane substantially parallel to the line of said gaging means and at a distance therefrom equal to the width of the strip to be cut, an intermittently acting feed means arranged to engage a strip severed from the sheet, said feed means being operated to feed the strip step by step, complemental cutting members arranged on respectively opposite sides of the path in which such strip is so fed, and means for moving one of said members against the other between the steps of feeding the strip.

In testimony whereof I have affixed my signature, in presence of two witnesses.

GEORGE B. GROVER.

Witnesses:
 ELINOR I. MATTSON,
 CHARLES F. HATHAWAY.